United States Patent
Alsafadi et al.

(10) Patent No.: US 6,793,127 B2
(45) Date of Patent: Sep. 21, 2004

(54) INTERNET ENABLED RESOURCE CONSTRAINED TERMINAL FOR PROCESSING TAGS

(75) Inventors: Yasser Alsafadi, Yorktown Heights, NY (US); Amr F. Yassin, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 166 days.

(21) Appl. No.: 09/826,250

(22) Filed: Apr. 4, 2001

(65) Prior Publication Data

US 2002/0170952 A1 Nov. 21, 2002

(51) Int. Cl.⁷ .............................................. G06F 17/00
(52) U.S. Cl. .................................. 235/375; 235/462.13
(58) Field of Search ................................ 235/375, 376, 235/462.01, 462.13, 462.46

(56) References Cited

U.S. PATENT DOCUMENTS 5,644,936 A * 7/1997 Yasutake et al. ........... 68/12.02
5,715,555 A * 2/1998 Reber et al. ................... 8/158
5,982,445 A * 11/1999 Eyer et al. ................. 348/841
6,377,999 B1 * 4/2002 Bartas ........................ 709/236

FOREIGN PATENT DOCUMENTS

| JP | 200273965 | 3/2002 | ............ G06F/17/60 |
| WO | 9957837 A | 11/1999 | |
| WO | 0049838 A | 8/2000 | ............ H05B/1/02 |

* cited by examiner

Primary Examiner—Daniel St. Cyr

(57) ABSTRACT

A resource constrained device is disclosed which includes a tag reader, e.g., an RFID or barcode reader, a communication unit that can communicate information read from the tags to an information interface, and a controller. The controller is arranged to send the information to the information interface via the communication unit. The information interface returns a response, e.g., comprising an XML document. The response is used by the controller to adjust operational parameters which modify the performance of an operational unit, e.g., a washing machine.

20 Claims, 5 Drawing Sheets

```
POST /soap/servlet/rpcrouter HTTP/1.1
Connection: Keep-Alive
Host: http://www.PhilipsServiceRouter.com:8080
Content-type: text/xml
Content-length: 527
SOAPAction: ""

<SOAP-ENV:Envelope xmlns:SOAP-ENV="http://schemas.xmlsoap.org/soap/envelope/"
xmlns:xsi="http://www.w3.org/1999/XMLSchema-instance" xmlns:xsd="http://www.w3.org/1999/XMLSchema">
<SOAP-ENV:Body>
<m: getWashingMachineSettings s xmlns:m="http://www.PhilipsServiceRouter.com/soap/WashingMachineSetting"
SOAP-ENV:encoding Style= "http://schemas.xmlsoap.org/soap/encoding/">
  <Reader>
    <Number> 1234567 </Number>
    <Manufacturer> Philips Semiconductor </Manufacturer>
  </Reader>
  <Garment>
    <RFTag xsi:type="xsd:string">AC 7B 9C 00 00 00 00 01 </RFTag>
    <Owner xsi:type="xsd:string">Gap Clothes</Owner>
  </Garment>
  <Terminal>
    <Brand xsi:type="xsd:string">Whirlpool</Brand>
    <Model xsi:type="xsd:string">1510M</Model>
  </Terminal>
</m: getWashingMachineSettings>
</SOAP-ENV:Body>
</SOAP-ENV:Envelope>
```

FIG. 5

```
HTTP/1.0 200 OK
Date: Wed, 13 Sep 2000 16:02:38 GMT
Status: 200
Set-Cookie2: JSESSIONID=To1075mC33008273B5008166At;Version=1;Discard;Path="/soap"
Servlet-Engine: Tomcat web Server/3.1 (JSP 1.1; Servlet 2.2; Java 1.3.0; Windows
NT 4.0 x86; java.vendor=Sun Microsystems Inc.)
Set-Cookie: JSESSIONID=To1075mC33008273B5008166At;Path=/soap
Content-Type: text/xml; charset=UTF-8
Content-Length: 707
Content-Language: en <SOAP-ENV:Envelope xmlns:SOAP-ENV="http://schemas.xmlsoap.org/soap/envelope/"
xmlns:xsi="http://www.w3.org/1999/XMLSchema-instance" xmlns:xsd="http://www.w3.org/1999/XMLSchema">
    <SOAP-ENV:Body>
        <ns1:getWashingMachineSettings
        xmlns:ns1="http://www.PhilipsServiceRouter.com/soap/WashingMachineSetting" SOAP-
        ENV:encodingStyle="http://schemas.xmlsoap.org/soap/encoding/">
        <return xmlns:ns2="urn:Whirlpool-WashingMachine-Settings" xsi:type="ns2:WMResponse">
            <washing xsi:type="ns2:washing">
                <temperature xsi:type="xsd:int"> 150 </temperature>
                <time xsi:type="xsd:int"> 20 </time>
                <rpm xsi:type="xsd:int"> 120 </rpm>
                ........
            </washing>
            <spinning xsi:type="ns2:spinning">
                <time xsi:type="xsd:int">5</time>
                <rpm xsi:type="xsd:int"> 600 </rpm>
                ........
            </spinning>
        </return>
        </ns1:getWashingMachineSettings>
    </SOAP-ENV:Body>
</SOAP-ENV:Envelope>>
```

FIG. 6

INTERNET ENABLED RESOURCE CONSTRAINED TERMINAL FOR PROCESSING TAGS

FIELD OF THE INVENTION

The present invention relates generally to the field of electronic devices, and more particularly to a system and method improving processing and enhancing performance of a service oriented device using information tags and a communication network.

BACKGROUND OF THE INVENTION

Smart labeling is the latest Radio frequency identification (RFID) technology, combining the advantages of barcode, Electronic Article Surveillance (EAS) and traditional RFID solutions. RFID systems allow for non-contact reading in manufacturing and other types of environments where barcode labels may not perform properly or be practical. RFID has applications in a wide range of markets including automated vehicle identification (AVI) systems and livestock identification because of its capability to track moving objects. The technology has become a primary player in identification, automated data collection, and analysis systems worldwide.

Such systems are designed to serve mass markets with many millions of labels needed per year. For example, Philips Semiconductors' ICODE ICs represent the state-of-the-art in smart label technology, offering a low-cost, re-programmable and disposable solution for source tagging, automatic data capture, theft protection and data storage on a product or its packaging. ICODE smart labels allow almost any item to be tagged for efficient handling. ICODE's highly automated item scanning process does not require line-of-sight and can scan multiple labels at the same time.

ICODE smart labels offers considerable benefits in a broad variety of applications. In airline baggage tagging and parcel services, smart labels offer considerable advantages in sorting and item tracking. In supply chain management systems, smart labels overcome the limitations of barcode technology, providing improved product distribution; and in libraries and rental applications, they provide automated check-in, check-out and inventory control.

As shown in FIG. 1, a conventional RRIF system 10 consists of a tag reader 11 which is connected to a personal computer 12 (PC) through a serial port 13. The PC 12 takes action as it reads the trigger of a tag 14. Information can be exchanged via a communication medium 15 (e.g., Internet or Intranet) with a remote server 16.

The tag reader 11 typically consists of three components:

An antenna or coil;

A transceiver (with decoder); and

A transponder (commonly called an RF tag) that is electronically programmed with unique information.

The antenna emits radio signals to activate the tag and read and write data to it. The Antenna is the conduit between the tag and the transceiver. It helps control the system's data acquisition and communication. The electromagnetic fields produced by the antenna can be constantly present or activated as needed when tags are detected by a sensor.

The data within the RF tag may provide identification for goods in manufacture, in transit or a location. Additional data may be provided for supporting applications through item specific information or instructions immediately available on reading the tag. For example, the color of paint for a car entering a paint sprayer on the production line, the set-up instructions for a configurable manufacturing apparatus or a shipment manifest.

While, as discussed above, these conventional system have many applications, they have typically been used for larger scale applications such as airline baggage reconciliation, postal tracking, road toll management and electronic article surveillance. As is apparent, such conventional system are geared to large scale inventory control or industrial and manufacturing applications. These types of conventional systems operate on dedicated systems that run custom applications. Moreover, the custom applications, while sophisticated, are designed to perform a limited number of specialized operations and tasks, and are not easily or quickly adaptable to many variations. These conventional systems generally lack the flexibility to perform in environments that require with many different inputs (i.e., compatibility) and variations (i.e., flexibility) that are required for general consumer applications (as discussed more fully below).

As is apparent from the above, a need exists for improved techniques for managing operation of RFID systems, such that compatibility and flexibility can be enhanced, particularly for consumer applications.

SUMMARY OF THE INVENTION

The invention provides a resource constrained device or terminal that allows tags or labels to be read and their content to be transmitted to a remote device. The remote device then sends a response to the resource constrained device which is process accordingly.

One application of the present invention allows such resource constrained devices to read tags and connect to a service provider to add more value. For example, the resource constrained device can be a washing machine, a microwave, a storage climate controller, other small similar devices, any other consumer product-type apparatus. In the case of a washing machine, tags of clothes can be read. Then the washing machine may connect to any one of a number of manufacturer web sites to retrieve care instructions for a specific garment. The washing machine is not limited to a particular type of tag information, manufacturer or web site for retrieving information. The request, i.e., document, sent by the resource constrained device is readable by multiple different remote servers.

One embodiment of the invention is directed to an apparatus including a label reader capable of reading information from a label, a communication unit capable of communicating information to one or more information interfaces and an operation unit having one or more operational parameters that may be adjusted. The apparatus also includes a controller arranged to (1) receive information from the label reader, (2) send a request to one or more of the information interfaces through the communication unit, (3) receive a response from the information interface, and (4) adjust the operation parameters of the operation unit in accordance with the response. The request and the response are formatted as documents capable of being exchanged in a distributed, decentralized environment.

In another embodiment, the requests sent by the apparatus and the responses from the information interface are formatted as XML documents.

Advantageously, the invention provides efficient techniques for adapting and tailoring the operating parameters of a plurality devices. The invention ensures that service requirements of any number of different items compatible and can be implemented in that device, thereby avoiding problems associated with inconsistent requirements (e.g., color clothes with white clothes). Although suited for use in manufacturing and industrial applications, the invention is particularly applicable to general consumer applications. These and other features and advantages of the present invention will become more apparent from the accompanying drawings and the following detailed description.

BRIEF DESCRIPTION OF THE DRAWINGS

FIG. 5 show an example of document sent by a resource constrained device to a remote server.

FIG. 6 show an example of a response sent by the remote server to the resource constrained device.

DETAILED DESCRIPTION OF THE INVENTION

Figure 1:
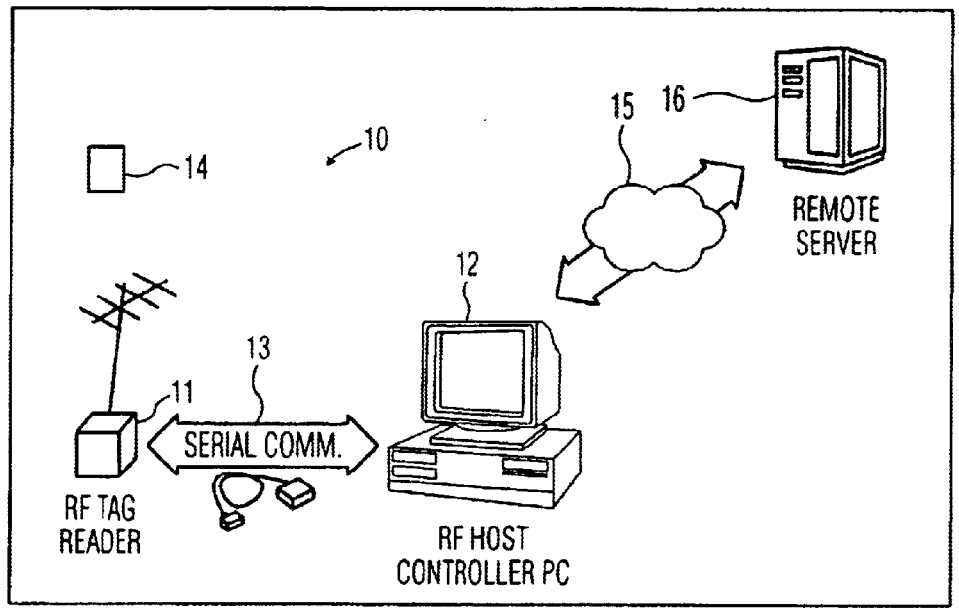
FIG. 1 shows a conventional RFID system.
Figure 2:
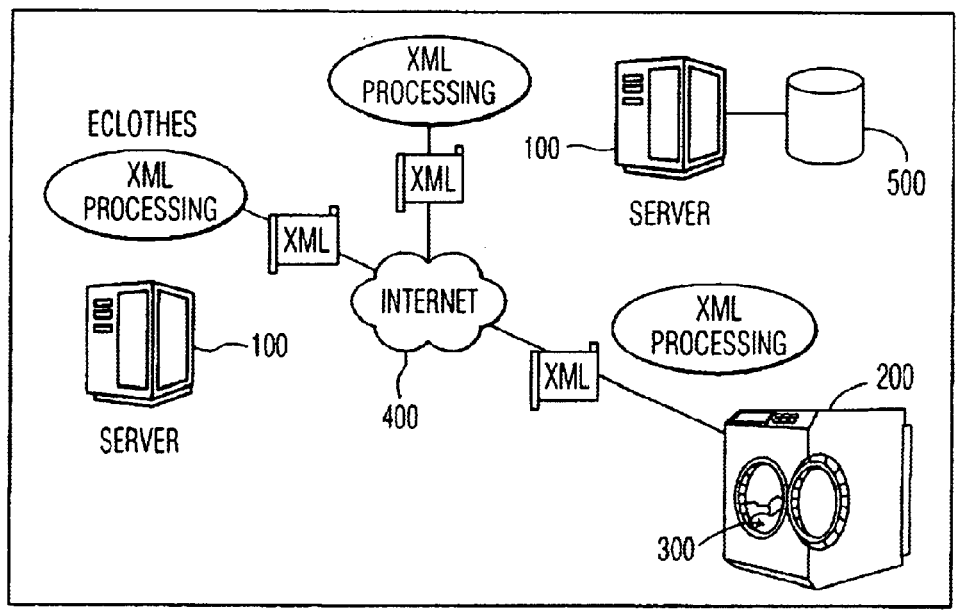
FIG. 2 illustrates the operation of a resource constrained system in accordance with a preferred embodiment of the invention.

FIG. 2 shows a preferred embodiment of the invention, in which one or more information interfaces 100 interact with a resource constrained device 200. The device 200 may represent a washing machine, a microwave, a storage climate controller, laptop or palmtop computer, a personal digital assistant (PDA), a telephone, television, set-top box or any other type of similar device that may have a plurality of changeable operating parameters. The changeable operating parameters are selected/adjusted to customize/tailor the operation of the device 200 in accordance with information from a tag or label 300 and instructions/information from the information interfaces 100. Preferably, the tag or label 300 comprises an RFID tag, but other types of information tags may be used, e.g., barcodes.

The device 200 can communicate to one or more of the more information interfaces 100 over a network 400. For example, the Internet may be accessed by the device 200 through wired connections, wireless connections or combinations thereof, using well-known conventional communication protocols such as the Internet Protocol (IP).

Figure 3:
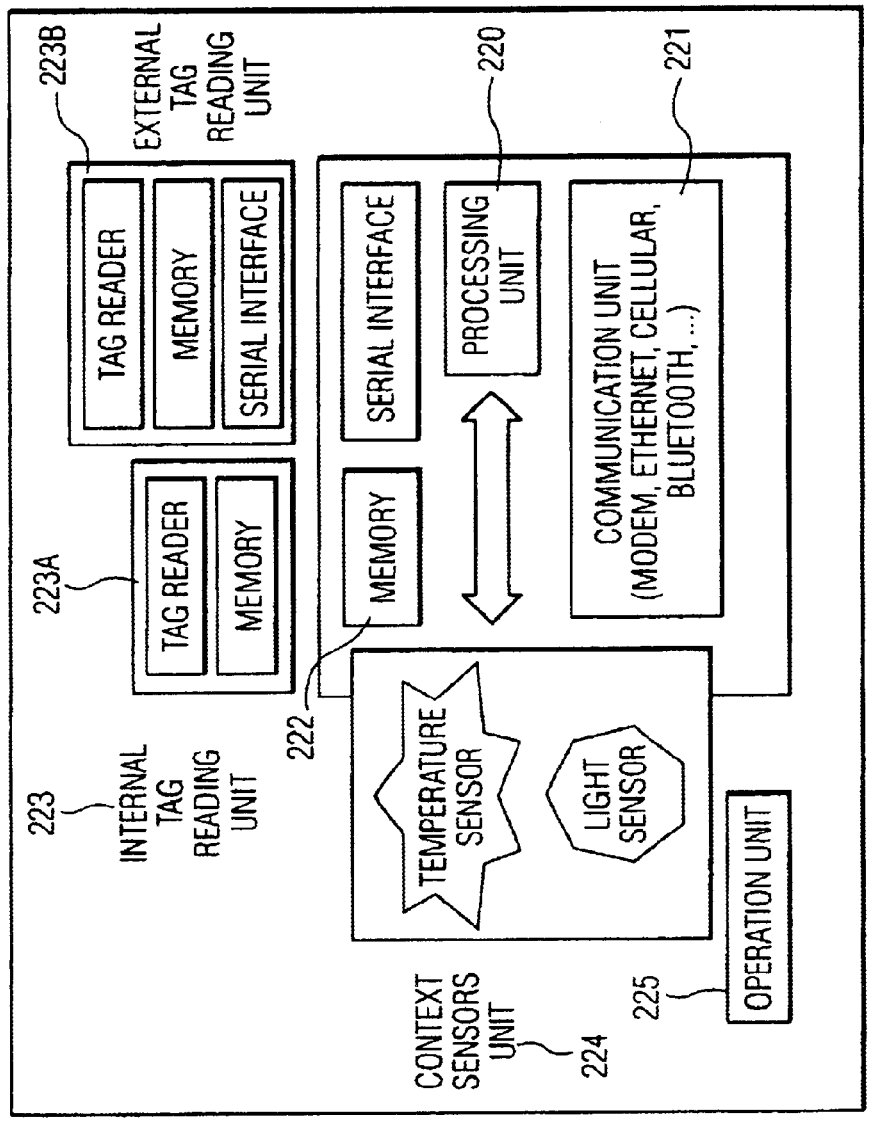
FIG. 3 is a block diagram of an exemplary resource constrained device in accordance with one embodiment of the invention.

FIG. 3 shows an example of a hardware design of the device 200 in accordance with one embodiment of the invention. In this example, the device 200 includes a processor 220 and a memory 222. The processor 220 may represent, e.g., a microprocessor, a central processing unit, a computer, a circuit card, an application-specific integrated circuit (ASICs), as well as portions or combinations of these and other types of processing device which already part of the device 200 (e.g., CPU for a television set). The memory 222 may represent, e.g., disk-based optical or magnetic storage units, electronic memories, as well as portions or combinations of these and other memory devices.

As shown, the device 200 also includes a communication unit 221 (e.g. Ethernet, Bluetooth, cellular or packet data interface), a tag reading unit 223 and one or more context sensors 224. The tag reading unit 223 may be internal to the device 200 in which the unit 223A appears as part of the memory space of the device 200 or an external reading unit 223B that can be accessed via a serial interface. Preferably, the tag reading unit 223 is an RFID type reader, but other types of tag/identity generation/reading mechanisms may be used, e.g., a barcode reader. The context sensors 224 may include any type of sensor necessary or useful for the specific device 200 (e.g., temperature sensors, light sensors, moisture sensors, motion sensors, infrared sensors, etc.).

The device 200 also include one or more operation units 225. The operation unit 225 performs the task which is adjusted in accordance the operational parameters associated with the device 200. For example, the operation unit 225 may be a cloth washing mechanism or a microwave oven or a television. It should be understood that these are only examples and the device 200 is not to be limited by these examples. The operation unit 225 can be any apparatus, device or mechanism whose operation can be controlled/modified/adjusted through one or more operational parameters. Illustratively, in the case of the washing machine, the operation parameters may include various wash settings, water temperature settings or length of the wash cycle.

Figure 4:
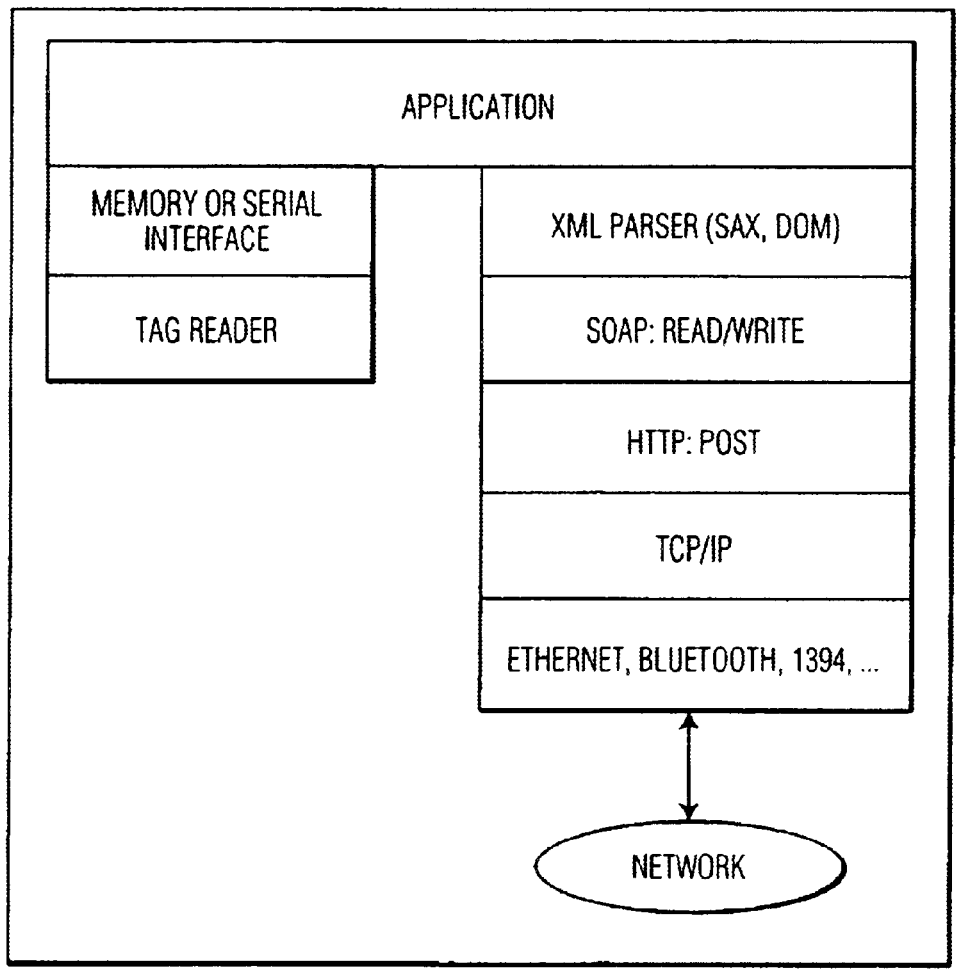
FIG. 4 is a block diagram of exemplary communication stacks for a resource constrained device in accordance with one embodiment of the invention.

The software design for the communication stacks of the device 200 are illustrated in the embodiment of FIG. 4. These stacks may include:

Physical and data link layers: Ethernet, Bluetooth, 1394, or other similar protocols Network and transport layers: IP and TCP protocols HTTP protocol: Post feature only Simple Object Access Protocol (SOAP): read/write capabilities only XML parser using Document Object Model (DOM) or Simple API for XML (SAX) interfaces. Preferably a micro XML parser (less than 40 KB in size) is used as described in U.S. patent application Ser. No. 09/725,970, filed Nov. 29, 2000, incorporated herein by reference.

Memory or serial interface to tag reader.

Extensible mark-up language (XML) is fast becoming the dominant language for describing content delivered over the Internet. The XML standard describes a class of data objects called XML documents and the behavior of computer programs which process such documents. XML documents are made up of storage units called entities, which contain either parsed or unparsed data. Parsed data is made up of characters, some of which form character data, and some of which form markup. Markup for a given XML document encodes a description of the storage layout and logical structure of that document. XML provides a mechanism to impose constraints on the storage layout and logical structure. Additional details regarding conventional XML may be found in XML 1.0 (Second Edition), World Wide Web Consortium (W3C) Recommendation, October 2000, www.w3.org/TR/REC-xml, which is incorporated by reference herein.

As referenced in FIG. 4, SOAP is a protocol for exchanging information in a distributed, decentralized environment. SOAP is an XML based protocol consisting of: an envelope which defines a means for describing what a message contains and how it is to be processed, encoding rules for expressing application-defined datatypes, and a convention for representing remote procedure calls and responses. SOAP messages are typically one-way transmissions from a sender to a receiver, but they can be combined to implement patterns such as request/response.

HTTP is a protocol with the lightness and speed necessary for a distributed collaborative hypermedia information system. It is a generic stateless object-oriented protocol, which may be used for many similar tasks such as name servers, and distributed object-orientated systems, by extending the commands, or "methods", used. A feature if HTTP is the negotiation of data representation, allowing systems to be built independently of the development of new advanced representations.

Sending data over the internet is typically performed using Transmission Control Protocol/Internet Protocol (TCP/IP) which is composed of layers:

IP—is responsible for moving packet of data from node to node. IP forwards each packet based on a four byte destination address (the IP number). The Internet authorities assign ranges of numbers to different organizations. The organizations assign groups of their numbers to departments. IP operates on gateway machines that move data from department to organization to region and then around the world.

TCP—is responsible for verifying the correct delivery of data from client to server. Data can be lost in the intermediate network. TCP adds support to detect errors or lost data and to trigger retransmission until the data is correctly and completely received.

Sockets—is a name given to the package of subroutines that provide access to TCP/IP on most systems.

The physical layer is concerned with the electrical, mechanical and timing aspects of signal transmission over a communication medium. The device 200 can include any one or more of a variety of well known layers such as modems, Ethernet, cellular and Bluetooth.

In operation, the device 200 receives/reads information the label 300. The label 300 may be active or passive. A determination is made as to which of the information interfaces 100 is to be contacted. This determination is based upon information received/read from the label 300. The device 200 then sends a document containing tag information to one or more of the more determined information interfaces 100. For example, the information interface 100 may be a web server of a clothing manufacturer. The device 200 then receives a response back from the information interface 100. In this example the response back may include handling instructions for care of a particular garment. The device 200 processes the response and adjust its operational parameter accordingly.

Other examples of applications for the device 200 include:

A) A television that changes viewing channels in accordance with label 300 information and a response from the information interface 100. In this case, the label 300 maybe associated with an advertisement for a particular TV program.

B) A PC with an Internet interface that connects to a particular web site in accordance with label 300 information and a response from the information interface 100. In this case, the label 300 maybe associated with an advertisement for a particular web site.

C) A refrigerator or microwave that adjusts it cooling or heating temperatures in accordance with food/cooking requirements. In this case, the refrigerator or microwave may also monitor (using the context sensors 224) and send dynamically information related to its current temperature to the information interface 100.

D) A telephone that dials a particular telephone number in accordance with label 300 information and a response from the information interface 100. In this case, the label 300 maybe associated with a customer service number for a product or service.

An advantage of the present invention is that a wide variety of system architectures can be used to implement the system of FIG. 2. Server-side and client-side architectures can be used. As briefly mention above, the information interface 100 may be a web server coupled to the device 200 over the Internet or other communication network.

As shown in FIG. 2, the information interface 100 may be coupled to a profile database 400. It is noted that the profile database 400 may be integrated with the information interface 100. The information interface 100 processes the document from the device 200 and accesses an appropriate profile from the profile database 400. The profiles represent information associated with the adjustable operation parameters for the device 200. One or more profiles may be associated with a particular tag or label 300 read by the device 200.

The tag or label 300, in turn, may be associated with a particular article or object. For example, the article may be clothing with special dry cleaning only instructions. In the washing machine example discuss above, if this label 300 is read, the washing machine would not operate because the response back from the information interface 100 would indicate that the clothing was to be dry cleaned only. It should be appreciated that the labels 300 and profiles are not limited to a particular manufacturer or type of article. The capability to process profiles from multiple manufacturers and for a plurality of types of articles may be supported by the device 200.

Returning to FIG. 2, in another embodiment, the device 200 may initially contact a first information interface 100 which includes an index/directory of other information interfaces 100. The document from the device 200 contains an identifier to direct the request to the appropriate information interface 100. In this manner, additional profiles may be added, as needed, which may support additional labels 300.

Preferably an XML/SOAP message is sent and received by the device 200 and the information interface 100. This is advantageous because messages can be exchanged efficiently in a distributed, decentralized environment. The XML/SOAP message can be adapted to many different applications.

FIG. 5 shows an example of a document sent by the device 200 to the information interface 100. The document is expressed as a SOAP message with an HTTP header.

FIG. 6 show an example of a response sent by the information interface 100 to the device 200. The response document is also expressed as a SOAP message with an HTTP header.

In this embodiment, the HTTP Post Module was designed to offer the posting mechanism needed by the resource constrained devices 200. Since a full implementation of the HTTP 1.1 specification was not necessary for this module, it only implements the HTTP POST command. The module may be built using the win-socket library (WinSock32.lib) available with Microsoft Visual Studio V: 6.0.

Since the requirements for the HTTP envelope are known and generally unchanging, this module hard codes most of the information needed to successfully create a POST connection with the information interface 100 (e.g., a server). The Header created by this module is shown below:

POST /xml-
soap/rpcrouter.jsp

-continued

```
HTTP/1.1
Connection: Keep-Alive
Host: cse-mfayad:8080
Content-type: text/xml
Content-length: 445
SOAPAction: ""
```

It is noted that in this embodiment, the only part of the HTTP request that needs to be created dynamically at this time, for the Pull model, is the Content-length attribute.

The SOAP Write Module may be created using Write-SOAP. WriteSOAP is a module for creating SOAP messages compliant with the SOAP specifications. See SOAP: Simple Object Access Protocol Version 1.1 (www.w3.org/TR/SOAP/), which is incorporated by reference herein. Another requirement for module is to create SOAP messages that can be understood by the APACHE-SOAP implementation. This is a very versatile tool for writing XML documents. It is able to make a direct mapping between various data-types and their equivalent representation in SOAP.

The functional operations associated with the device 200, as described above, may be implemented in whole or in part in one or more software programs stored in the memory 222 and executed by the processor 220. The network 300 may represent a global computer communications network such as the Internet, a wide area network, a metropolitan area network, a local area network, a cable network, a satellite network or a telephone network, as well as portions or combinations of these and other types of networks. The information interfaces 100 and the device 200 may themselves be respective server and client machines coupled to the network 300.

While the present invention has been described above in terms of specific embodiments, it is to be understood that the invention is not intended to be confined or limited to the embodiments disclosed herein. On the contrary, the present invention is intended to cover various structures and modifications thereof included within the spirit and scope of the appended claims.

What is claimed is:

1. An apparatus comprising:
   a label reader capable of reading information from a label;
   a communication unit capable of communicating with a first information interface having an index and/or one or more other information interfaces;
   an operation unit having one or more adjustable operational parameters associated with one or more operation profiles; and
   a controller, coupled to the label reader, the communication unit and the operation unit, arranged to (1) receive information from the label reader, (2) send a request to the first information interface and/or one or more other information interfaces through the communication unit, (3) receive a response from one or more information interfaces, and (4) adjust the operation parameters of the operation unit in accordance with the response,
   wherein the request and the response are formatted as documents capable of being exchanged in a distributed, decentralized environment.

2. The apparatus according to claim 1, wherein the apparatus and the information interface communicate in a client/server network.

3. The apparatus according to claim 2, wherein the documents comprise XML documents.

4. The apparatus according to claim 3, wherein the XML documents are expressed as SOAP messages.

5. The apparatus according to claim 1, wherein the operation unit comprises a consumer product-type apparatus.

6. The apparatus according to claim 1, further comprising a context sensor coupled to the controller.

7. The apparatus according to claim 1, wherein the one or more information interface respond by sending a profile associated with label information contained within the request from the apparatus.

8. The apparatus according to claim 1, wherein the label reader comprises an RFID reader or a barcode reader.

9. The apparatus according to claim 1, wherein the index is a directory of other information interfaces and allows operation profiles to be added, as needed, which can support additional tags.

10. An apparatus comprising:
    a memory; and
    a processor coupled to the memory and operative to read information from a tag, communicate with a first information interface having an index and/or one or more other information interfaces, receive a response from the one or more information interfaces, and adjust one or more operational parameters of an operation unit in accordance with the response,
    wherein the request and the response are formatted as documents capable of being exchanged in a distributed, decentralized environment.

11. The apparatus according to claim 10, wherein the apparatus and the information interface communicate in a client/server network.

12. The apparatus according to claim 11, wherein the documents comprise XML documents.

13. The apparatus according to claim 12, wherein the XML documents are expressed as SOAP messages.

14. The apparatus according to claim 11, wherein the information interface responds by sending a profile associated with label information contained within the request from the apparatus.

15. The apparatus according to claim 12, further comprising a micro XML parser.

16. The apparatus according to claim 10, wherein the operation unit comprises a consumer product apparatus.

17. The apparatus according to claim 10, further comprising a context sensor coupled to the controller.

18. The apparatus according to claim 10, wherein the tag comprises an RFID or barcode tag.

19. A resource constrained device comprising:
    means for reading tags;
    communication means for communicating information read from the tags to a remote device;
    receiving means for receiving a response comprising an XML document from the remote device, the receiving means including a micro XML parser;
    operational means for performing a task, the operational means including adjustable operational parameters modifying the performance of the task;
    wherein the adjustable operational parameters are adjusted in accordance with the received response.

20. The device according to claim 19, wherein said means for reading comprises an RFID or barcode reader.

* * * * *